United States Patent
Moore et al.

(10) Patent No.: US 9,473,313 B2
(45) Date of Patent: Oct. 18, 2016

(54) SYSTEM AND METHOD FOR DYNAMIC PROVISIONING

(75) Inventors: Ben Moore, Victoria (CA); Vinay Kumar, Brampton (CA); Philip Steele, Hillsburgh (CA); Bohdan Zabawskyj, Woodbridge (CA)

(73) Assignee: Redknee Inc., Mississauga (CA)

( * ) Notice: Subject to any disclaimer, the term of this patent is extended or adjusted under 35 U.S.C. 154(b) by 576 days.

(21) Appl. No.: 13/122,058

(22) PCT Filed: Oct. 3, 2008
(Under 37 CFR 1.47)

(86) PCT No.: PCT/CA2008/001758
§ 371 (c)(1),
(2), (4) Date: Jul. 13, 2011

(87) PCT Pub. No.: WO2010/037202
PCT Pub. Date: Apr. 8, 2010

(65) Prior Publication Data
US 2011/0269421 A1     Nov. 3, 2011

(51) Int. Cl.
H04W 4/00       (2009.01)
H04L 12/14      (2006.01)
H04M 15/00      (2006.01)
H04L 29/08      (2006.01)
(Continued)

(52) U.S. Cl.
CPC .......... *H04L 12/14* (2013.01); *H04L 12/1467* (2013.01); *H04L 41/0806* (2013.01); *H04L 41/5029* (2013.01); *H04L 41/5054* (2013.01); *H04L 41/5074* (2013.01); *H04L 67/125* (2013.01); *H04L 67/306* (2013.01); *H04M 15/49* (2013.01); *H04M 15/68* (2013.01); *H04L 41/0213* (2013.01); *H04L 41/0233* (2013.01); *H04M 2215/0196* (2013.01); *H04M 2215/46* (2013.01); *H04W 8/18* (2013.01)

(58) Field of Classification Search
USPC ....... 455/405–408, 414.1, 422.1, 432.1–449, 455/550.1, 552.1, 553.1, 556.1, 556.2; 370/310.2, 328, 331, 338, 351–356; 379/201.02, 201.12, 15.03, 111–141
See application file for complete search history.

(56) References Cited

U.S. PATENT DOCUMENTS 6,934,530 B2 * 8/2005 Engelhart ..................... 455/406
7,510,113 B2   3/2009 Igarashi et al.
(Continued)

FOREIGN PATENT DOCUMENTS

EP     0952539 A2    10/1999
WO   03100647 A1    12/2003
WO  2008045618 A1    4/2008

OTHER PUBLICATIONS

European Search Report dated Mar. 13, 2012 in connection with PCT (priority) application PCT/CA2008/001758.
(Continued)

*Primary Examiner* — San Htun
(74) *Attorney, Agent, or Firm* — Gardner, Linn, Burkhart & Flory, LLP

(57) ABSTRACT

A system and method for dynamic provisioning is provided. In an embodiment, a provisioning engine receives data representing a device profile, a device state and a network state, and to the extent that the device profile, device state and network state are not consistent, the engine can dynamically re-provision the device to achieve an alternative provisioning.

16 Claims, 7 Drawing Sheets

Fig. 1

(51) Int. Cl.
*H04L 12/24* (2006.01)
*H04W 8/18* (2009.01)

(56) References Cited

U.S. PATENT DOCUMENTS

| | | |
|---|---|---|
| 2002/0087674 A1* | 7/2002 | Guilford et al. ............. 709/223 |
| 2005/0083899 A1* | 4/2005 | Babbar et al. ............... 370/342 |
| 2006/0078064 A1* | 4/2006 | Schmidt et al. ............. 375/296 |
| 2006/0209773 A1 | 9/2006 | Hundal |
| 2006/0268835 A1* | 11/2006 | Hyotylainen et al. ....... 370/352 |
| 2007/0223437 A1 | 9/2007 | Virgile |
| 2008/0119160 A1* | 5/2008 | Andriantsiferana et al. . 455/406 |
| 2008/0140650 A1 | 6/2008 | Stackpole |
| 2008/0167033 A1* | 7/2008 | Beckers ..................... 455/432.3 |
| 2008/0261593 A1* | 10/2008 | Wong et al. ............... 455/435.1 |
| 2009/0081996 A1* | 3/2009 | Duggal et al. ............. 455/414.1 |

OTHER PUBLICATIONS

International Search Report and Written Opinion of the International Searching Authority from corresponding International Application No. PCT/CA2008/001758, mailed Jun. 30, 2009.

International Preliminary Report on Patentability for International Application No. PCT/CA2008/001758, dated Feb. 3, 2011.

* cited by examiner

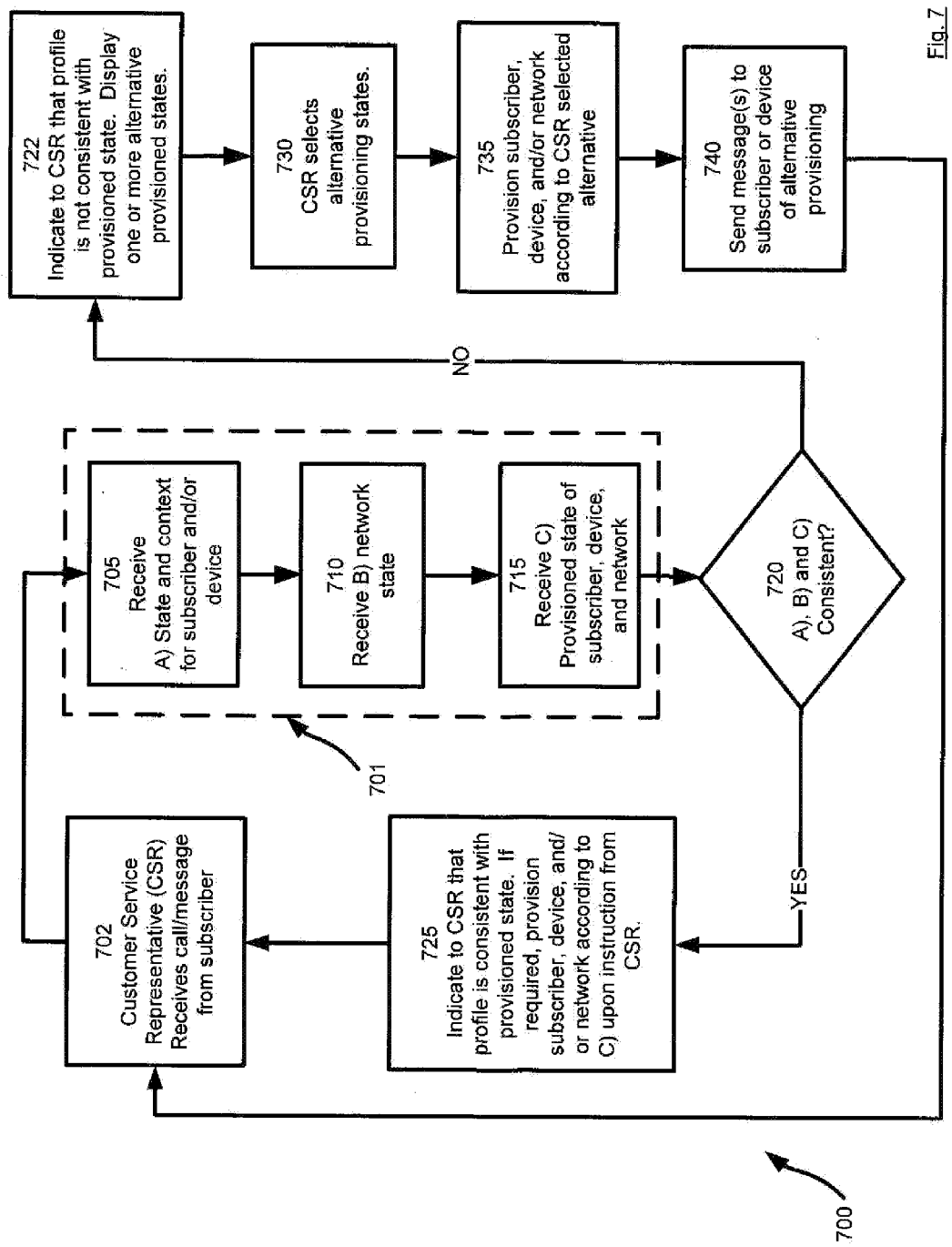

SYSTEM AND METHOD FOR DYNAMIC PROVISIONING

FIELD

The present specification relates generally to communication networks and more particularly relates to a system and method for dynamic provisioning.

BACKGROUND

A wide range of protocols are now available for telecommunication links, often for the same device. For example, a single modern mobile electronic device with telephony and data capabilities can often select between one or more of 3G, 2G, and Unlicensed Mobile Access (UMA) access technologies and protocols. Furthermore, those same access technologies and protocols can, themselves, be available on multiple channels and through different providers for the same device.

Such electronic devices are often individually provisioned according to specific desires or wishes of an individual as arranged with a given provider. For example, even though the device can be capable of utilizing 3G access technologies and protocols (3G), the device can be provisioned so that it uses 2G access technologies and protocols (2G). Different applications can also be provisioned to use different access technologies and protocols from the same device depending on context. Problems can arise, however, when the device is provisioned in a manner that is not consistent with the offerings of a given network to which the device is connected or when transient conditions within a given network result in a suboptimal delivery of one or more services using one or more access technologies and protocols.

In addition to the array of devices, protocols, and their specific provisioning issues within these hybrid networks, there is also a complex echo-system of walled garden applications, mobile services, and content services. These value added services (VAS) represent an increasing source of subscriber revenues as traditional voice, messaging, and data services are commoditized. Recognizing the need to find additional sources of subscriber revenue to offset the commoditization of traditional services, network operators are starting to deploy and support more of these VAS applications. In turn, these VAS applications are increasing in complexity with respect to their interaction both with the subscriber and also with the existing elements within the network. Examples include social networking based applications which integrate subscriber profile and preferences, location, presence, and enhanced messaging into a consolidated subscriber experience. That is, the delivery of contemporary and anticipated value added services requires the orchestration of an increasingly complex network of network elements, service delivery nodes, content partners, operational support systems, business support systems, bearer and transport systems, as well as access technologies used to link the network to electronic devices. A disruption in one or more of these components can result in a material degradation of one or more services provided by the network operator to a given electronic device.

This new mobile landscape of high speed multimedia devices which leverage several network technologies simultaneously combined with the ecosystem of VAS applications presents a new and unique challenge to a network operator's customer care organization to provide adequate technical support to customers. Not only does a customer service representative need to understand the provisioning and status of the device within the network, but also the status and issues with the VAS applications and the subscriber's status and activity within these applications.

Within the typical carrier, support for new applications and services is often undertaken by presenting the customer care organization with a new interface or set of interfaces to perform provisioning and technical troubleshooting of the new service. Examples would include an interface to troubleshoot and provision a wireless email service or an online photo album. The customer care organization must train staff to be capable of maintaining an expert level trouble shooting experience on a continuously increasing number of systems and interfaces. When this is coupled with the fact that customer service is a high churn industry, carriers are forced to absorb the increasing cost and time commitments to getting new support staff up to speed. Another impact of the increasing support complexity is that new services take longer to roll out and when they do, customer satisfaction (CSAT) may not be optimal as they do not get the support they need on the first call when they reach the call center.

SUMMARY

An aspect of the specification provides a method for dynamically provisioning at least one of a network and a portable electronic device comprising:

receiving a network state of a network connectable to the device;

receiving a normal profile associated with the device;

determining if the normal profile and the network state are consistent; and, provisioning at least one of the network and the device within the network according to an alternative profile if the normal profile and the network state are not consistent.

The normal profile can comprises a first link according to a first protocol and the alternative profile is based on a second link having a different protocol than the first link. The alternative profile can include modifying a billing rate associated with usage of the second link. The billing rate can be equal to or less than a rate associated with the normal profile. The billing rate can be sent to a billing server in association with usage of the device according to the alternative profile.

The method can further comprise sending a message notifying of the alternative profile.

The method can further comprise sending the message to the device.

The method can further comprise sending the message to a billing server to modify billing associated with usage of the device according to the alternative profile.

The method can further comprise receiving a device state and wherein the determining step further comprises determining if the device state is consistent with the normal profile and the network state.

The method can further comprise repeating the receiving and determining steps and provisioning the device within the network according to the normal profile if the normal profile and the network state are consistent.

Another aspect of the specification provides a provisioning engine comprising a processor and a plurality of interfaces interconnected by the processor. The interfaces are connectable to a plurality of network elements, a network management server and an electronic device via a network. The processor is configured to receive data representing a network state of the network via the network management server. The processor is also configured to maintain a profile associated with the electronic device. The processor is further configured to determine if the normal profile and the network state are consistent and to provision the device within the network via the network elements according to an alternative profile if the normal profile and the network state are not consistent.

The normal profile can comprise a first link according to a first protocol and the alternative profile is based on a second link having a different protocol than the first link. The alternative profile can include modifying a billing rate associated with usage of the second link. The rate can be equal to or less than a rate associated with the normal profile.

The processor can be further configured to send the billing rate to a billing server in association with usage of the device according to the alternative profile.

The processor can be further configured to send a message notifying of the alternative profile.

The processor can be further configured to send the message to the device.

The processor can be further configured to send the message to a billing server to modify billing associated with usage of the device according to the alternative profile.

The processor can be further configured to receive a device state and wherein the processor is further configured to determine if the device state is consistent with the normal profile and the network state.

The processor can be further configured to re-provision the device within the network according to the normal profile if the network profile and the network state are consistent.

BRIEF DESCRIPTION OF THE DRAWINGS

FIG. 7 shows a flowchart depicting a method of dynamic provisioning in accordance with another embodiment.

DETAILED DESCRIPTION OF THE EMBODIMENTS

The present specification provides various systems and methods which dynamically provision network elements, service delivery nodes, content partners, operational support systems, business support systems, bearer and transport systems, as well as access technologies used to link the network to electronic devices and device provisioning profiles of electronic devices. The systems and methods can unify and proactively manage the end to end service delivery experience in a manner the optimizes the end to end service delivery experience given the state of the subscriber, electronic device, as well as the various elements within the network. The present patent specification addresses the optimization of the end to end delivery of services in the context of the following non-limiting set of scenarios. (1) The subscriber's (and associated device(s)) current state and context within the network, including the current state (e.g. active on 2G, 3G, UMA; which applications are active on a device) and context (e.g. location) of a device and the subscriber's context within the elements of the network (e.g. which applications are active on a given element of a network to support the service to be delivered to the device or to be used by an application resident on the device); (2) The state of the network and the associated network infrastructure that is used to manage or provide services to the subscriber or device including network elements, service delivery nodes, content partners, operational support systems, business support systems, bearer and transport systems, as well as access technologies used to link the network to electronic devices; (3) The subscriber's (and associated device(s)) provisioned status within the network and device(s), including the actual device provisioning and the provisioning of elements of the network that manage or provide services to the subscriber or device including network elements, service delivery nodes, content partners, operational support systems, business support systems, bearer and transport systems, as well as access technologies used to link the network to electronic devices; (4) The subscriber's history and usage patterns including the usage of network resources (as typically indicated by event records generated or maintained by network elements, service delivery nodes, content partners, operational support systems, business support systems, bearer and transport systems, as well as access technologies used to link the network to electronic devices, actions invoked via a given device).

Figure 1:
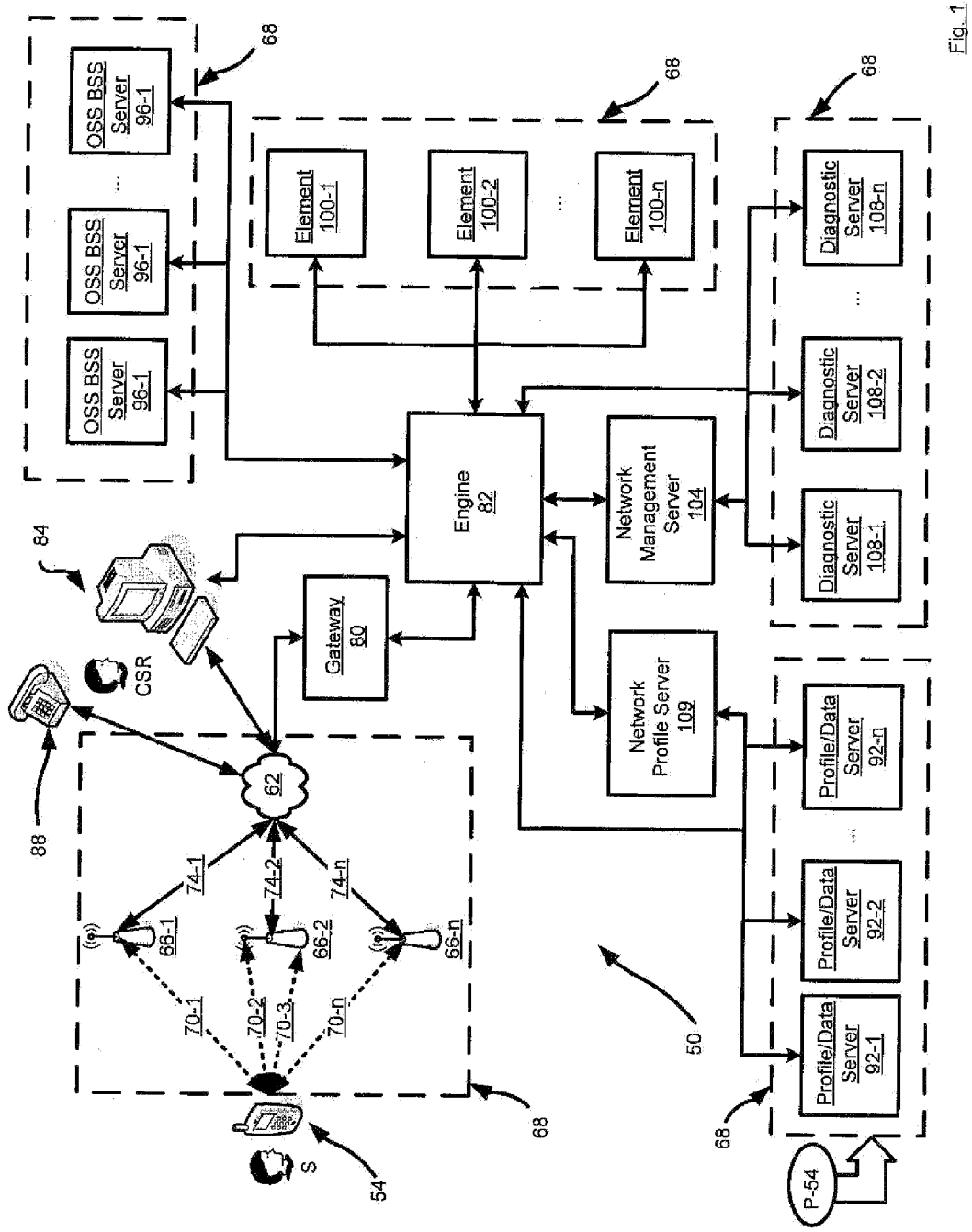
FIG. 1 shows a schematic representation of a system for dynamic provisioning in accordance with an embodiment.

Referring now to FIG. 1, a system for dynamic provisioning is indicated generally at 50. As will become apparent from the discussion below, the system and its components are configured to provision at least one of a network and a device according to the teachings herein. System 50 comprises an electronic device 54 that is connectable to a core network 62 via a one or more base stations 66-1, 66-2, ... 66-n (generically, base station 66, and collectively, base stations 66. This nomenclature is used elsewhere herein). In a present embodiment electronic device 54 is mobile such that one or more wireless links 70-1, 70-2, 70-3, 70-n can be employed between electronic device 54 and each base station 66-1, 66-2 and 66-n, specifically as shown in FIG. 1 or according to any other connections based on the location and structure of a particular base station 66 and device 54. Any known appropriate backhaul links 74-1, 74-2, 74-n can be used between base station 66 and core mobile core network 62.

Backhaul links 74 include network infrastructure that is complementary to the protocol(s) being carried by a particular base station 66. Such network elements are discussed further below as elements 100. Such backhaul links 74 also include diagnostic servers that are complementary to the protocol(s) being carried by a particular base station 66. Such diagnostic servers are discussed further below as diagnostic servers 108.

Core network 62 generally comprises network infrastructure that is compatible with the protocols supported by base stations 66 and backhaul links 74, and can, if desired, additionally support other protocols such as those normally supported by the public switched telephone network (PSTN), the Internet, and/or any other types of circuit or packet switched networks.

More specifically, core network 62 includes network elements that are complementary to the protocol(s) supported by base stations 66 and links backhaul 74. Such network elements (which can also be referred to as service delivery nodes) are discussed further below as elements 100. Core network 62 also includes diagnostic servers that are complementary to the protocol(s) supported by base stations 66 and backhaul links 74. Such diagnostic servers are discussed further below as diagnostic servers 108.

Core network 62 also includes business support systems and operational support systems that are complementary to the management, rating, billing, operations, maintenance, and provisioning of services provided to subscriber S via electronic device 54, base stations 66, and links 74. Such business support system (BSS) and operational support systems (OSS) are discussed further below as OSS BSS servers 96. (OSS BSS servers 96 are referred to elsewhere herein as support servers). Core network 62 also includes profile servers that contain data associated with the subscriber S, electronic device 54, or services used in connection with subscriber S or electronic device 54. Such profile servers are discussed further below as profile/data servers 92.

Collectively, links 70, base stations 66, and backhaul links 74, and core network 62 (including network elements 100, diagnostic servers 108, profile servers 92, and OSS BSS servers 96) comprise a mobile network 68. The hashed-boxes in FIG. 1 labelled with reference character 68 represent that the components within those hashed-boxes are all components within mobile network 68.

Figure 2:
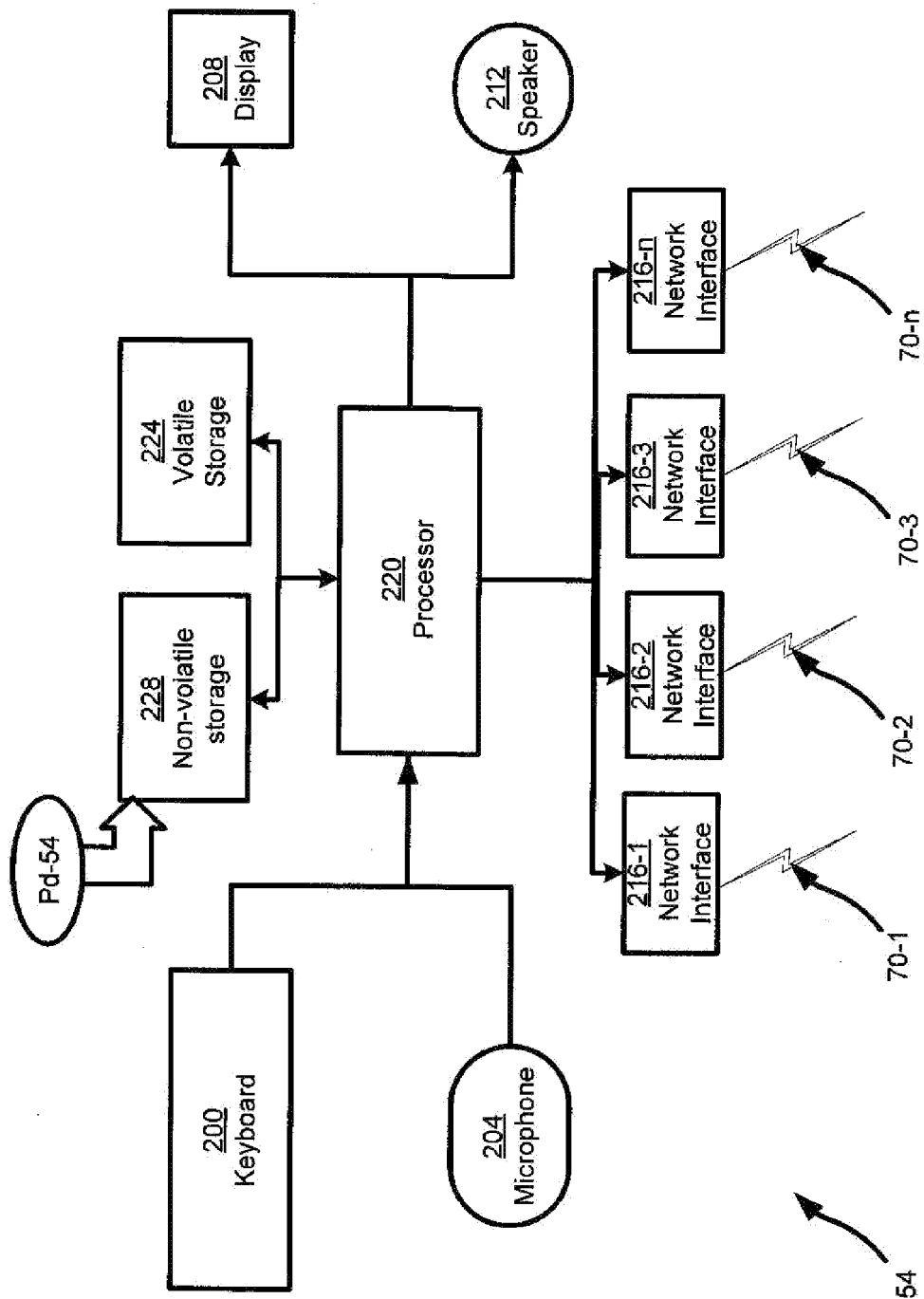
FIG. 2 shows a schematic representation of an electronic device that can be used with the system of FIG. 1.

Referring briefly to FIG. 2, electronic device 54 is shown in greater detail. Electronic device 54 in a present embodiment is based on the computing environment of a mobile wireless device that comprises the functionality of a cellular telephone, wireless email pager, wireless web-browser and a personal digital assistant. Electronic device 54 thus includes a hardware configuration that comprises one or more input devices in the form of a keyboard 200, microphone 204 and the like; one or more output devices in the form of a display 208, a speaker 212 and the like. Electronic device 54 also includes a plurality of network interfaces 216, implemented in the form of radios in the present embodiment. Each network interface 216 is configured for conducting wireless communications over its respective link 70. For example, link 70-1 can be based on the Global System for Mobile communications (GSM) or Code Division Multiple Access (CDMA) protocol; link 70-2 can be based on the 2G protocols (e.g. Enhanced Data Rates for GSM Evolution (EDGE) protocol or CDMA2000 1xRTT); link 70-3 can be based on 3G protocols (e.g. High Speed Packet Access (HSPA), Wideband Code Division Multiple Access (WCDMA), Long Term Evolution (LTE), CDMA2000 EV-DO, or CDMA2000 EV-DV); and link 70-n can be based on unlicensed mobile access (UMA) protocols. The foregoing components are interconnected by a microcomputer comprised of one or more central processing units 220 connected to volatile memory 224 (e.g. random access memory) and non-volatile memory 228 (e.g. FLASH memory). As will be discussed further below, in a present embodiment volatile memory 224 also maintains a device provisioning profile Pd-54 that indicates criterion or criteria for usage of different network interfaces 216 as well as applications supported by the device 54 and services rendered by the device 54 (e.g. a mobile TV or video streaming service). As will be explained further below, however, provisioning profile Pd-54 can be omitted or complemented in certain embodiments by provisioning states and profiles maintained and/or derived by engine 82.

It should now be understood that in other embodiments electronic device 54 can be based on other types of mobile computing devices, including the computing environment of a desktop computer, a workstation, a thin-client or the like.

Referring again to FIG. 1, system 50 also comprises a dynamic provisioning engine 82 that connects to core network 62 via a gateway 80. Dynamic provisioning engine 82 can be based on any suitable server computing environment. While not shown herein, it will understood by those skilled in the art the server includes a hardware configuration that may comprise one or more input devices in the form of a keyboard, a mouse and the like; one more output devices in the form of a display, and the like; a network interface for conducting network communications; all of which are interconnected by a microcomputer comprised of one or more central processing units that itself is connected to volatile memory and non-volatile memory. (The computing environment shown in FIG. 2 presents an generally analogous environment to the computing environment of engine 82). As will become apparent from the following discussions, the computing environment of engine 82 will also comprise software processes that can be read from and maintained in non-volatile memory (or other computer readable media) that can be executed on the one or more central processing units. It will also be understood that engine 82 can be implemented as a plurality of servers to provide scalability.

As indicated above, engine 82 connects to mobile network 68 via one or more gateways 80 in order to provide updates to the subscriber S or device 54 with respect to their provisioned status in the mobile network 68 or device 54. Gateway 80 includes network infrastructure that is complementary to the protocol(s) supported by base stations 66 and backhaul links 74. Such network elements and service delivery nodes are discussed further below as elements 100. Gateway 80 can be, for example, a Short Message Service Center (SMSC) or Multimedia Message Service Center (MMSC) so that engine 82 can send short messages to device 54, an instant messaging server so that engine 82 can send instant message notifications to subscriber S or a device 54, or an e-mail server so that engine 82 can sent e-mail notifications to a subscriber 54 or device 54. Gateway 80 can also be a provisioning gateway for sending device provisioning information (e.g. device provisioning profile Pd-54) to device 54. Those skilled in the art will recognize that a variety of gateways can be used to convey updates and messages to or from the subscriber S or device 54. Those skilled in the art will recognize that the gateway 80 can also be used in order to receive inputs or commands from the subscriber S or device 54. For example, an e-mail response can be received from subscriber S or device 54 via mobile network 68 by an e-mail server whereby the addressing information indicates that the destination of the message is the engine 82 and the content of the message indicates that the subscriber has either acknowledged his/her modified provisioned state in mobile network 68 and/or device 54. As another example, a SMS message can be received from device 54 via mobile network 68 by an SMS-C whereby the addressing information indicates that the destination of the message is the engine 82 and the content of the message indicates that the subscriber has selected a preferred state relative to two or more options offered to the subscriber. Those skilled in the art will recognize that in certain embodiments gateway(s) 80 may be linked to or incorporated within elements 100 (e.g. SMSC, MMSC).

Engine 82 also connects to a customer service terminal 84 that can be used by a customer service representative CSR. In various optional embodiments, a subscriber S at device 54 can contact customer service representative CSR via mobile network 68 so that subscriber S can indicate to customer service representative CSR a desired profile (as can be reflected via provisioning profile Pd-54) for subscriber S or device 54, and likewise customer service representative CSR can then interact with engine 82 to implement the desired profile. In various optional embodiments, a subscriber S can contact customer service representative CSR via a telephone 88 and PSTN, so that subscriber S can indicate to customer service representative CSR a desired profile (as can be reflected via provisioning profile Pd-54) for subscriber S or device 54, and likewise customer service representative CSR can then interact with engine 82 to implement the desired profile. In various optional embodiments, the engine 82 can autonomously highlight discrepancies as well as recommend one or more alternative provisioned states for either the mobile network 68 or device 54 to the customer service representative CSR. The customer service representative CSR can resolve the discrepancies, implement one or more alternative provisioned states as recommended by engine 82, or implement another provisioned state upon the explicit instruction of the customer service representative via engine 82.

In various optional embodiments, engine 82 can autonomously implement provisioned states in the mobile network 68. To the extent that a customer service representative CSR retrieves the provisioned state of subscriber S or device 54, engine 82 will optionally indicate any autonomous action(s) undertaken by engine 82 to resolve a discrepancy or modify the provisioned state of a subscriber S or device 54 as well as any communication with subscriber S or device 54 including updates sent to subscriber S or device 54 as well as any input or commands received from subscriber S or device 54. Engine 82 also connects to one or more profile/data servers 92-1, 92-2, . . . 92-n (generically, profile/data server 92, and collectively, profile/data servers 92). (Profile/data servers 92 are also referred to elsewhere in this specification as simply profile servers). Profile/data servers contain subscriber S or device 54 data (e.g. language preferences, subscribed features or applications, capabilities and features of the device 54), usage data (e.g. usage records pertaining to services used by the subscriber S or device 54), or contextual data (e.g. state of the subscriber in a given application (e.g. current progress information in a given game, location information in various geodetic formats, generic presence and state information (e.g. on-line, off-line, busy, available, do-no-disturb, happy, sad). Those skilled in the art will recognize that a subset of the information contained in profile/data servers 92 may be applicable to or directly linked to the information contained in profile P-54 for device 54. Engine 82 can access and modify subscriber S or device data resident in profile/data servers 92 in order to correct or modify the provisioned state of subscriber S or device 54 via a variety of protocols and interfaces including lightweight directory access protocol (LDAP) as well as application programming interfaces (APIs) based on based on Common Object Request Broker Architecture (CORBA) or Simple Object Access Protocol/Extensible Markup Language (SOAP/XML). For example, engine 82 can modify a device's maximum data rate to 64 Kbps via a 2G access technology and protocol as a subset of the default provisioning state for subscriber S or device 54 upon detection of a network congestion scenario via diagnostic servers 108. As another example, engine 82 can activate services and applications (e.g. mobile TV services) upon detection that the device 54 has been modified to be 3G capable (e.g. by installing the subscriber's subscriber identification module (SIM) in a 3G capable device). Engine 82 can also access and modify subscriber S or device 54 data resident in profile/data servers 92 via a network profile server 109 that provides access to retrieve and modify subscriber S or device 54 data via one or more abstracted APIs. The foregoing teachings relative to the network profile server 109 can be supplemented by the teachings of copending application PCT/CA2007/001570, "METHOD AND SYSTEM FOR ACTIVE PROFILE SERVER" and the teachings of U.S. Pat. No. 7,379,737, "Telecommunications subscriber profile management system", the contents of which are incorporated herein by reference. Those skilled in the art will recognize that in certain embodiments profile/data servers 92 may be linked to or incorporated within elements 100 (e.g. Home Location Register, Home Subscriber Server, Gateway Mobile Location Centre), diagnostic servers 108, and OSS BSS servers 96.

Engine 82 also connects to one or more OSS BSS servers 96-1, 96-2, . . . 96-n (generically, OSS BSS server 96, and collectively, OSS BSS servers 96). OSS BSS server 96 can be based on a service control point (SCP) or the like in the prepaid context, or it can be based on a billing server utilizing customer detail records (CDR), or the like in the post-paid context, or OSS BSS server 96 can be based on combinations or enhancements thereof. In general, OSS BSS 96 are configured to maintain and process rating and billing information relative to subscriber S or device 54. Engine 82 can connect to OSS BSS servers 96 directly via a number of interfaces and protocols including APIs as well as via a charging gateway (not shown). The foregoing teachings relative to the charging gateway can be supplemented by the teachings of copending patent application publication US 20040105424, "Method for implementing an Open Charging (OC) middleware platform and gateway system", the contents of which are incorporated herein by reference. For example, engine 82 can access OSS BSS servers to provision a new price plan relating to a new provisioned state in the mobile network (e.g. the subscriber S or device 54 default access technology and protocol was modified from 3G to 2G access resulting in a reduced data charging tariff). As another example, the customer service representative can select a proposed provisioning state as recommended by engine 82 in conjunction with a credit value which can be applied to the subscriber's S or device's 54 pre-paid or post-paid balance or account as the case may be.

Engine 82 also connects to a plurality of network elements 100-1, 100-2 . . . 100-n, which are a part of mobile network 68. Network elements 100 can thus comprise one or more of a Home Location Register (HLR), Home Subscriber Server (HSS), Gateway Mobile Location Center (GMLC), Mobile Switching Center (MSC), Visitor Location Register (VLR), Equipment Identity Register (EIR), Short Message Service Center (SMSC), Multimedia Message Service Center (MMSC), Authentication Centre (AuC), Subscriber Locator Function (SLF), Gateway MSC (GSMC), Serving General Packet Radio Service (GPRS) Support Node (SGSN), Gateway GPRS Support Node (GGSN), Cell Broadcast Center (CBC), Packet Data Serving Node (PDSN), Call Session Control Function (CSCF), Media Gateway Control Function (MGCF), IP Multimedia Subsystem-Media Gateway Function (IMS-MGW), Multimedia Resource Function Controller (MRFC), Multimedia Resource Function Processor (MRFP), Breakout Gateway Control Function (BGCF), Application Server (AS), Interconnection Border Control Function (IBCF), Signalling Gateway Function (SGW), Security Gateway (SEG), Application Function (AF), Policy Decision Function (PDF), WLAN Access Gateway (WAG), Packet Data Gateway (PDG), Broadcast-Multicast Service Centre, Policy and Charging Rules Function (PCRF), Policy and Charging Enforcement Function (PCEF), UMA Network Controller (UNC), Signal Transfer Point (STP), an Authentication, Authorization, Accounting server (AAA), a voicemail server (VM), a UMA server, a remote management server (RMS), a Blackberry Enterprise Server (BES), or a Blackberry Internet Server (BIS). Engine 82 can connect to network elements 100 directly via a variety of interfaces and protocols or via a provisioning server (not shown) in order to access, retrieve, or modify the provisioned state associated with a subscriber S or device 54. Those skilled in the art will recognize that the nature of the network elements will evolve with advances in network technologies and will include new or modified network elements as prescribed by, but not limited to, 3GPP TS 23.002 "Network Architecture" and 3GPP2 X.S0013 "All-IP Core Network Multimedia Domain" as amended from time to time. Engine 82 can be configured to include appropriate interfaces and protocol converters to communicate with each of gateway(s) 80, profile/data servers 92, OSS BSS servers 96, network elements 100, network profile server(s) 109, diagnostic servers 108, and network management server(s) 104 in a manner that is native to each of those components, so that no modification to those components is required.

Network elements 100 represent elements that are part of backhaul links 74 and core network 62 according to the protocol(s) being supported by base stations 66 that are connected to device 54. Thus, as a non-limiting example, assume that network element 100-1 is an MSC and is used to provide circuit switched connectivity to device 54 via backhaul links 74-2 and base station 66-2, network element 100-2 is a SGSN and is used to provide 2G packet switched connectivity to device 54 via backhaul links 74-2 and base station 66-2, network element 100-3 (not shown) is a UMA Network Controller that is used to provide UMA connectivity to device 54 via base station 66-1 and backhaul link 74-1. However, in more complex examples, it will be understood that a plurality of different network elements 100 can reside within the core network and along each backhaul link 74, as appropriate to structurally define a particular service for a subscriber S or device 54.

Engine 82 also connects to one or more diagnostic servers 108-1, 108-2, . . . 108-n (generically, diagnostic server 108, and collectively, diagnostic servers 108) directly or via a network management server 104. Diagnostic servers 108 are also part of mobile network 68. Network management server 104 (or collectively diagnostic servers 108) is (are) configured to provide the overall state of mobile network 68. Examples of diagnostic servers 108 include servers configured to execute "HP Openview" from Hewlett-Packard Company 3000 Hanover Street Palo Alto, Calif. 94304-1185 USA; or an SS7 Link Monitor, such as that described in "SS7 Link Monitors—More new technology that will affect billing", Ed Finegold, May 1, 1997, B/OSS—Billing and OSS World, http://www.billingworld.com/articles/archives/ss7-link-monitors-more-new-technology-that.html. For example, diagnostic servers 108 can be placed along each backhaul link 74 so as to provide network diagnostics and/or state information about each backhaul link 74. As another example, diagnostic servers 108 or network management server 104 can monitor the status of network elements 100 via operational measurement logs and event records as well as interfaces and protocols including, but not limited to, Simple Network Management Protocol (SNMP) in order to determine the status of the network and associated applications and services. In an non-limiting embodiment, engine 82 can be informed of a transient event in mobile network 68 (e.g. a degradation of 3G service in a given geographic region served by a set of base stations). The engine 82 can take proactive steps to modify the provisioned state associated with subscriber S or device 54 in order to optimize the delivery of services as well as the price or rate plans relative to the state of the mobile network 68 and the subscriber S or device 54 profile and usage patterns as maintained by the profile/data servers. The engine 82 can also notify the subscriber S or device via gateway 80 of the transient event and the proactive steps undertaken on behalf of the subscriber S or device 54. In another embodiment, the engine 82 can solicit confirmation from subscriber S or device 54 via gateway 80 before implementing a new provisioned state on behalf of subscriber S or device 54. In another embodiment, engine 82 can provide two or more options and receive input with respect to the preferred option before implementing a new provisioned state on behalf of subscriber S or device 54.

Figure 3:
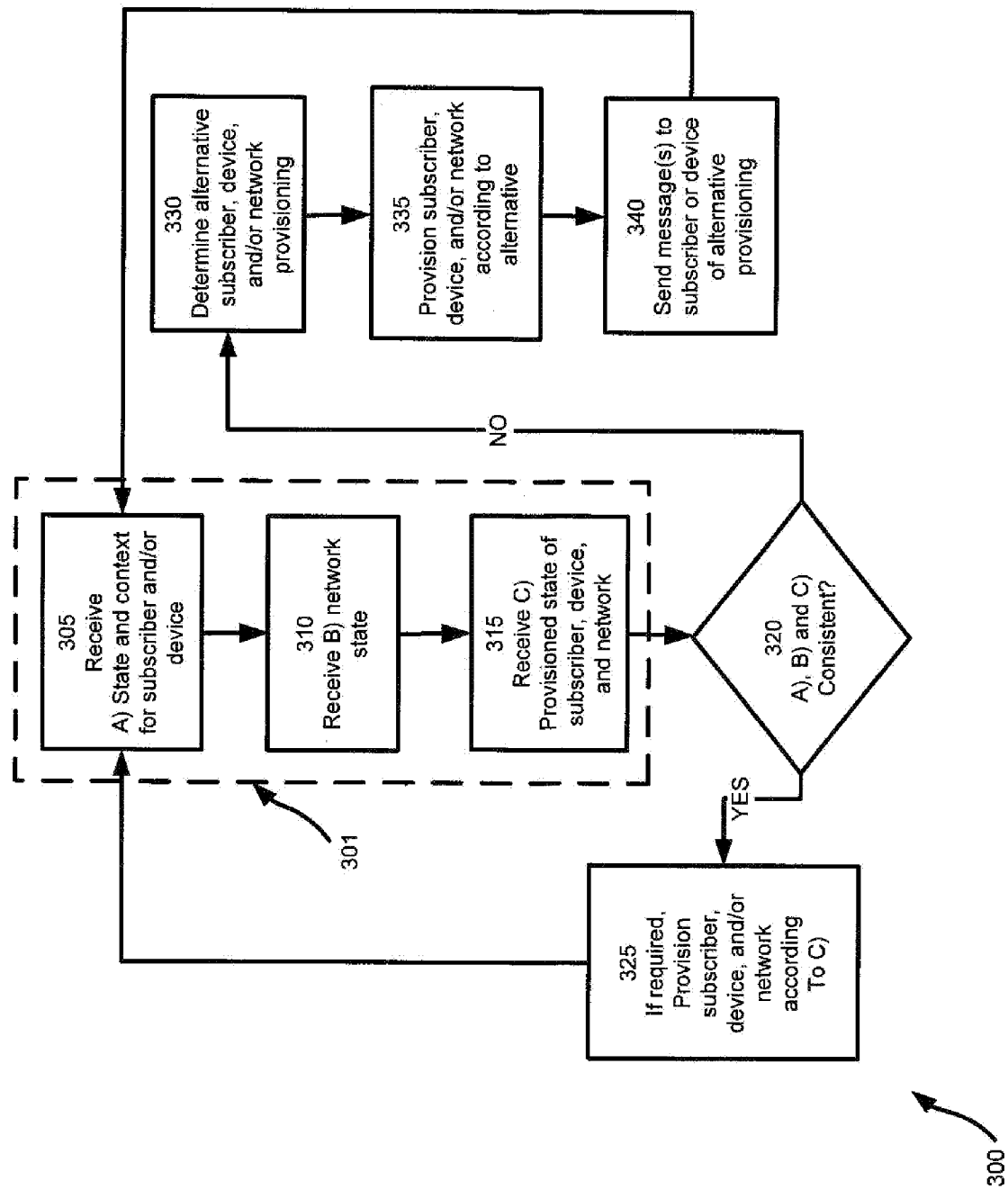
FIG. 3 shows a flowchart depicting a method of dynamic provisioning in accordance with another embodiment.

Referring now to FIG. 3, a flowchart depicting a method for dynamic provisioning is indicated generally at 300. Method 300 can be implemented using system 50, or a variant thereof.

To assist with understanding method 300, it will be discussed according to a possible implementation of method 300 using system 50. To further assist with understanding method 300, the following assumptions will be made about system 50. It will be assumed that:

a) interface 216-1, link 70-1, base station 66-1 and backhaul link 74-1 are configured to operate using the GSM protocol;

b) interface 216-2, link 70-2, base station 66-2 and backhaul link 74-2 are configured to operate using the EDGE protocol;

c) interface 216-3, link 70-3 are configured to operate using the 3G protocol, and that base station 66-2 and backhaul link 74-2 are additionally configured to operate using a 3G protocol; and d) interface 216-n, link 70-n, base station 66-n and backhaul link 74-n are configured to operate using a UMA protocol.

It will also be further assumed that element 100-1 and diagnostic server 108-1 are associated with link 74-1; that element 100-2 and diagnostic server 108-2 are associated with link 74-2 and that element 100-n and diagnostic server 108-n are associated with link 74-n. Element 100-1 can therefore be any type of known network element that is consistent with a GSM network, such as an HLR, a VLR, an MSC, an SMSC or the like that operates according to the standards that govern GSM. Element 100-2 can therefore be any type of known network element that is consistent with a EDGE access technology and protocol, such as an HLR, a VLR, an MSC, an SGSN, a GGSN or the like that operates according to the standards that govern EDGE. Element 100-3 can therefore be any type of known network element that is consistent with a 3G network, such as an HLR, a VLR, an MSC, an SGSN, a GGSN, a PCEF, a PCRF, a CSCF or the like that operates according to the 3G standard. Element 100-n can therefore be any type of known network element that is consistent with a UMA network such as an AAA server, a UNC, a PDG or the like that operates according to the standards that govern a UMA network. Those skilled in the art will recognize that other network elements may be used in the context of other access technologies. For example, a packet serving data node (PDSN) for a code division multiple access (CDMA) based network; the IP edge router for a European Telecommunications Standards Institute (ETSI) based network; the cable Modem termination system (CMTS) for a PacketCable based network; a access service network (ASN) gateway for a WiMax based network; or a deep-packet inspection node for a generic internet protocol based network.

It will also be assumed that profile associated with subscriber S and device 54 is defined to according the contents of Table I. In an embodiment, the profile may be correlated with device profile P-54.

TABLE I

Profile for Subscriber S or Device 54

| Service Identity | Network Interface | Link | Protocol | Permitted/Not Permitted |
|---|---|---|---|---|
| 1 | 216-1 | 70-1 | GSM | Permitted |
| 2 | 216-2 | 70-2 | EDGE | Permitted |
| 3 | 216-3 | 70-3 | 3G | Not Permitted |
| 4 | 216-n | 70-n | UMA | Not Permitted |

Explaining Table I in greater detail, network interface 216-1 (using the GSM protocol), and network interface 216-2 (using the EDGE protocol) are indicated as "Permitted" according to the established profile for subscriber S or device 54, meaning that subscriber S or device 54 is permitted to conduct communications over links 70-1 and 70-2. However, network interface 216-3 (using the 3G protocol) and network interface 216-n (using the UMA protocol) are indicated as "Not Permitted", meaning that device 54 is not permitted to conduct communications over links 70-3 and 70-n, even though links 70-3 and 70-n may be available. It should be understood that the profile for subscriber S or device 54 in Table I is highly simplified for purposes of explanation. More complex examples of profiles will be provided further below.

Figure 4:
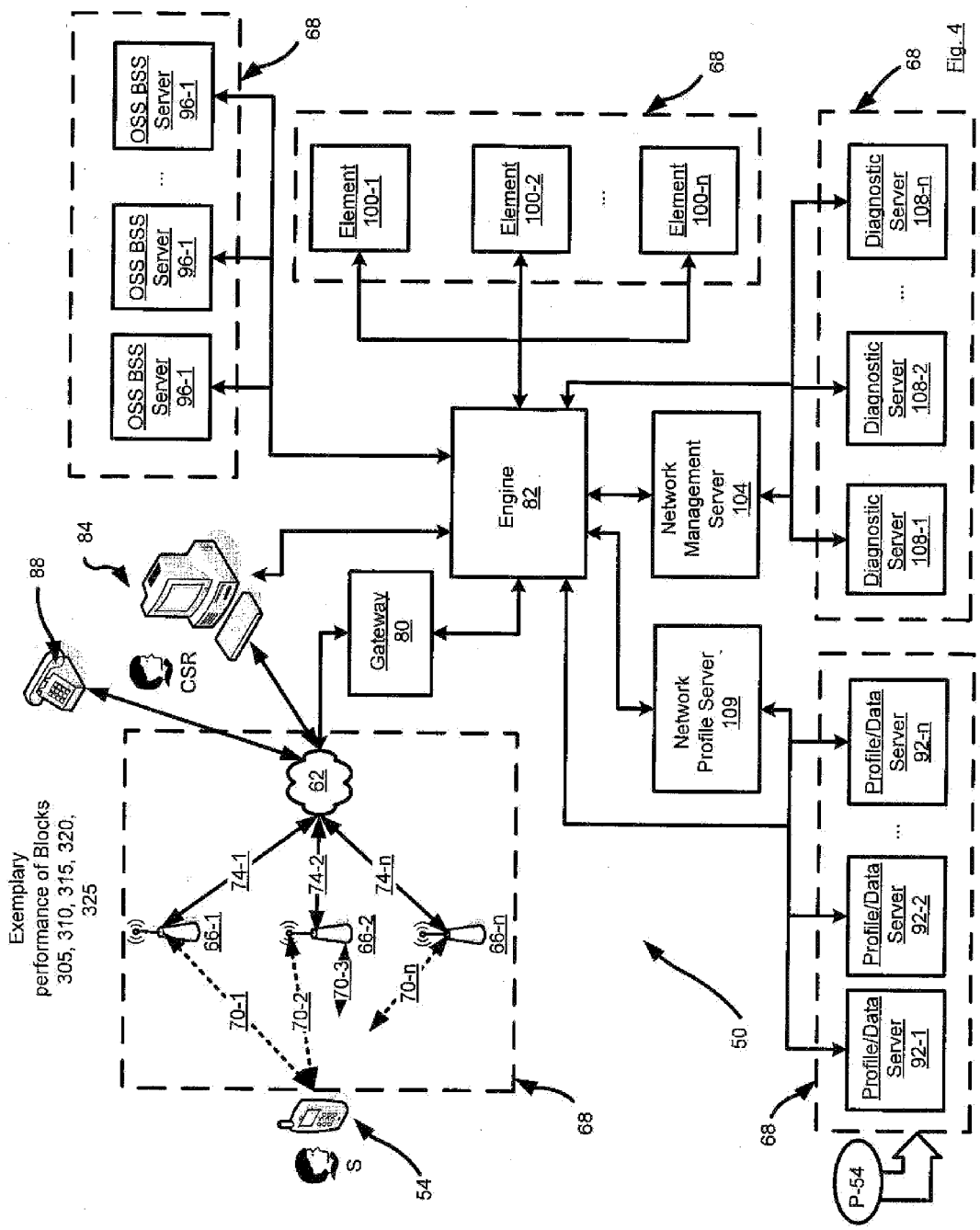
FIG. 4 shows a variation of the system of FIG. 1 in accordance with certain assumptions that are made for exemplary purposes of explaining the method of FIG. 3.

FIG. 4 shows a representation of system 50 wherein Table I is stored on profile servers 92 (and in an embodiment, the profile defined by Table I may be correlated with device profile Pd-54) as profile P-54. FIG. 4 also represents that links 70-1 and 70-2 are active, as both links 70-1 and 70-2 are drawn in FIG. 4 as interconnecting device 54 and their respective base stations 66, which is consistent with the permissions in Table I. FIG. 4 also shows a representation that links 70-3 and 70-n are inactive, as both links 70-3 and 70-n are drawn in FIG. 4 as not interconnecting device 54 and their respective base stations, which is also consistent with the permissions in Table I.

Continuing now with the explanation of method 300, block 305 comprises receiving the state and context of subscriber S or device 54. In system 50, block 305 is performed by engine 82 receiving state and context information about subscriber S or device 54. Such state and context information about subscriber S or device 54 can be obtained by querying elements 100, profile/data servers 92, network profile server 109, network management server 104, OSS BSS servers 96, and diagnostic servers 108. Exemplary queries in an embodiment include retrieving the current subscription, rate-plan, service, and application profile information for subscriber S or device 54. Exemplary queries in an embodiment also include retrieving the active access technologies for a given subscriber S or device 54 (e.g. 2G, 3G, UMA), which applications or services are active or resident on a device (e.g. circuit switched voice, instant messaging, mobile TV), the current location of subscriber S or device 54 (e.g. device 54 is presently served by base station 66-1 with associated geodetic coordinates; device 54 is presently located at WGS-84 coordinates: 6,378,137.0 m (semi-major axis a), 6,356,752.314 245 m (semi-minor axis b), 298.257 223 563 (inverse flattening)), which application servers are providing services to subscriber S or device 54 (e.g. element 100-3 (not shown), an instant messaging server, is supporting the instant messaging application resident on device 54). In the example shown in FIG. 4, a query to diagnostic servers 108 would return an indication that links 70-1 and 70-2 are active. In another example, a query to network elements 100 (e.g. an HLR) would indicate that the device has registered on the network and has requested services to be provided via GSM and EDGE. In another example, a query to profile servers 92 would indicate that one or more value added services (e.g. instant messaging, mobile TV) associated with subscriber S or device 54 are active or inactive as the case may be.

Block 310 comprises receiving the network state. The network state can include the state of the associated network infrastructure that is used to manage or provide services to the subscriber or device including network elements, service delivery nodes, content partners, operational support systems, business support systems, bearer and transport systems, as well as access technologies used to link the network to electronic devices. In system 50, block 310 is performed by engine 82 receiving state information about mobile network 68 from diagnostic servers 108 directly or via network management server 104. In other embodiments, engine 82 can also receive state information about mobile network from elements 100 or OSS BSS servers 96. In the example shown in FIG. 4, diagnostic servers 108 or network management server 104 would provide availability and status information about backhaul links 74-1, 74-2, . . . 74-n as well as the associated network infrastructure used to provide services to subscriber S or device 54. For example, a query to diagnostic servers 108 or network management server 104 would indicate the status and availability for network element 100-3 (not shown) (an instant messaging server) that is supporting an instant messaging application resident on device 54.

Block 315 comprises receiving the provisioned status of subscriber S or device 54 including current device provisioning as well as the current provisioning of network infrastructure that manage or provide services to the subscriber or device including network elements, service delivery nodes, content partners, operational support systems, business support systems, bearer and transport systems, as well as access technologies used to link the mobile network 68 to the device 54. In system 50, block 315 is performed by engine 82 receiving provisioned status information for subscriber S or device 54 from profile/data servers 92 or network profile server 109. In other embodiments, engine 82 can also receive subscriber S or device 54 provisioned status information from OSS BSS servers 96. In the example shown in FIG. 4, profile/data servers 92 or network profile server 109 would provide provisioned status information used to provide services to subscriber S or device 54. For example, a query to profile/data servers 92 or network profile server 109 would indicate that the subscriber is subscribed to receive GSM and EDGE services and has an active subscription to an instant messaging service. As another example, a query to profile/data servers 92, network profile server 109, or OSS BSS servers 96 would indicate that the subscriber is associated with a pre-paid account and application specific rate plan for the instant messaging service as well as a post-paid account and associated rate plan for a number of GSM and EDGE services. In an embodiment, the engine 82 may query the history and usage patterns associated with subscriber S or device 54 including the actions invoked using device 54 and usage of network resources (as typically indicated by event records generated or maintained by network elements, service delivery nodes, content partners, operational support systems, business support systems, bearer and transport systems, as well as access technologies used to link the mobile network 68 to device 54). For example, the engine 82 may query profile/data servers 92, network profile server 109, or OSS BSS servers 96 and ascertain that subscriber S has exceeded the allocated volume of minutes or data associated with the subscriber's rate plan by more than 25% for the last three consecutive billing periods or that the subscriber S has repeatedly requested services that are not readily provided by the default access technologies (e.g. mobile TV or Voice over IP via EDGE).

The hashed-box in FIG. 3 labelled with reference 301 represent that the blocks 305, 310, and 315 collectively constitute a method of receiving the state and context of a device or subscriber on a network. The specific blocks 305, 310 and 315 reflect one sub-method of implementing block 301, comprised of receiving the state and context of subscriber S or device 54; receiving the network state; and receiving the provisioned status of subscriber S or device 54 including current device provisioning as well as the current provisioning of network infrastructure. Of note is that not all blocks of method 301 need be performed in order to retrieve the data associated with block 301.

To the extent that a subscriber is associated with multiple devices, it should be understood that blocks 305, 310, and 315 can be re-performed for each device associated with subscriber S.

Block 320 comprises determining whether the state and context of subscriber S or device 54 from block 305, the network state from block 310, and the provisioned status of subscriber S or device 54 from block 315 are consistent. If "yes", then method 300 advances from block 320 to block 325 where subscriber S or device 54 is provisioned in a manner that is consistent with the provisioned status received at block 315. In the example in FIG. 4, a "yes" determination would be made at block 320, because a) the state and context of subscriber S or device 54 including the status of the available network interfaces and links are consistent with the available backhaul links 74-1 and 74-2; device 54 has registered with mobile network 68 and the requested services are consistent with the capabilities provided by mobile network 68; b) the associated network infrastructure including links 70-1 and 70-2 and network elements are active and available or operational for the purpose of providing the subscribed or requested services for subscriber S or device 54 and; c) the provisioned status associated with subscriber S or device 54 is consistent with the state and context of subscriber S or device 54 as well as the network state associated with network infrastructure used to provide services to subscriber S or device 54 (e.g. the network is capable of providing GSM and EDGE services to device 54 via backhaul links 74-1 and 74-2; the instant messaging server is active and can support the instant messaging service resident on device 54 via backhaul link 74-2).

In an embodiment, at block 325, engine 82 may optionally proactively apply or reaffirm provisioned states in network elements 100, OSS BSS servers 96, profile servers 92 (directly or via network profile server 109). In an embodiment, at block 325, engine 82 may optionally proactively apply or reaffirm provisioned states for device 54 in profile P-54 to comply with the provisioned state of the mobile network 68.

To the extent that a subscriber may be associated with multiple devices, it should be understood that blocks 325 can be re-performed for each device associated with subscriber S.

Figure 5:
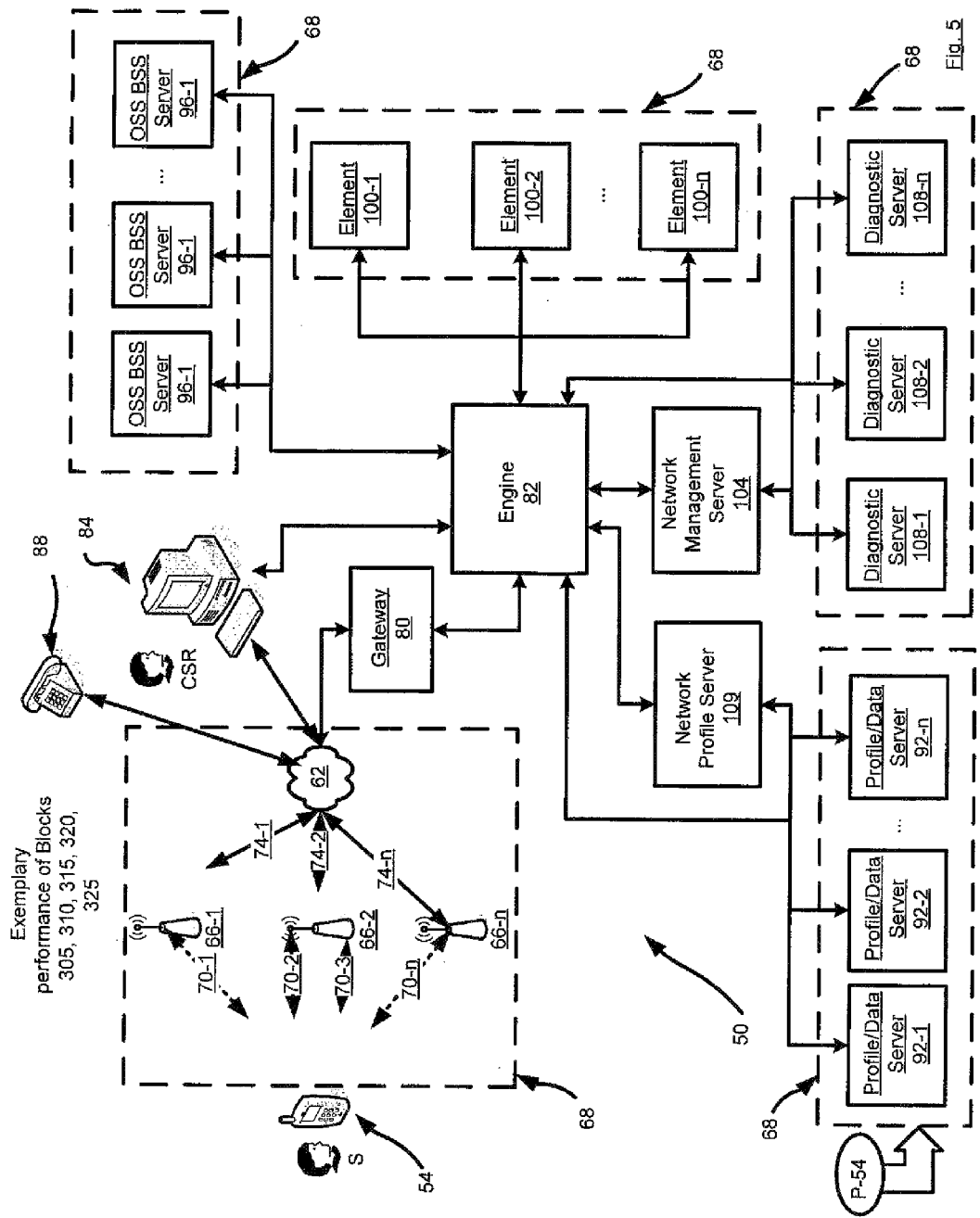
FIG. 5 shows a variation of the system of FIG. 1 in accordance with certain assumptions that are made for exemplary purposes of explaining the method of FIG. 3.

Upon completion of block 325, which is optional, method 300 returns to block 305 where method 300 begins anew. At this point it is useful to vary certain assumptions about system 50 for purposes of further explanation. FIG. 4 showed one set of assumptions about system 50, wherein the various links that were available to device 54 were consistent with the profile (according to Table I) that is associated with subscriber S or device 54. FIG. 5 shows another set of assumptions about system 50, wherein various links that are available to subscriber S or device 54 are NOT consistent with the profile (according to Table I) that is associated with subscriber S or device 54. Of note is that in FIG. 5, backhaul links 74-1 and 74-2 are disabled, for whatever reason, and therefore base stations 66-1 and 66-2 are not connected to core network 62, essentially rendering links 70-1 and 70-2 unavailable to subscriber S or device 54.

Thus, when blocks 305-320 are performed using the assumptions in FIG. 5, a "No" determination is made at block 320. More specifically, in the example in FIG. 5, a "No" determination would be made at block 320, because a) the state and context of subscriber S or device 54 including the status of the available network interfaces are not consistent with the disabled backhaul links 74-1 and 74-2; device 54 has effectively deregistered with mobile network 68 and previously requested services cannot be provided by mobile network 68; b) a subset of the associated network infrastructure including links 70-1 and 70-2 are inactive otherwise not operational for the purpose of providing the subscribed or requested services for subscriber S or device 54 and; c) the provisioned status associated with subscriber S or device 54 is not consistent with the state and context of subscriber S or device 54 as well as the network state associated with network infrastructure used to provide services to subscriber S or device 54 (e.g. the network is not capable of providing GSM and EDGE services to device 54 via backhaul links 74-1 and 74-2; the instant messaging server is active and cannot support the instant messaging service resident on device 54 via disabled backhaul link 74-2). Furthermore, at block 310, an update of the network state indicates that while links 74-1 and 74-2 are unavailable, that link 74-*n* is available and that link 70-*n* is available. Thus, at block 320, a determination is made that the state and context of subscriber S or device 54 from block 305, the network state from block 310, and the provisioned status of subscriber S or device 54 from block 315 are NOT consistent, and therefore a "No" determination is made at block 320.

Block 330 comprises determining alternative provisioning for subscriber S, device 54, or mobile network 68. In the example of FIG. 5, an alternative provisioning for subscriber S or device 54 can be determined so that UMA connectivity is provided to device 54 via link 70-*n*, base station 66-*n*, and backhaul link 74-*n* as well as any other relevant network elements associated with core network 62. Specifically, at block 330, a modified provisioned state that uses UMA connectivity would be determined as: a) the requested services associated with subscriber S or device 54 are consistent with capabilities provided with mobile network 68 using UMA connectivity (for example, voice and instant messaging services can be provided using UMA connectivity); b) the network infrastructure associated with UMA connectivity including link 70-*n*, base station 66-*n*, and backhaul link 74-*n* as well as any other relevant network elements associated with core network 62 are active and available or operational for the purpose of providing the subscribed or requested services for subscriber S or device 54 and; c) the alternative provisioned state for the subscriber S, device 54, and mobile network 68 would result in a state and context for subscriber S and device 54 that is relatively consistent with the default (i.e. in accordance with Table I) state and context for subscriber S and device 54 in the context of the default services and applications which would otherwise be made available to subscriber S or device 54 prior to the transient events that caused one or more disruptions within mobile network 68 (for example, voice and instant messaging services can be provided using UMA connectivity).

Figure 6:
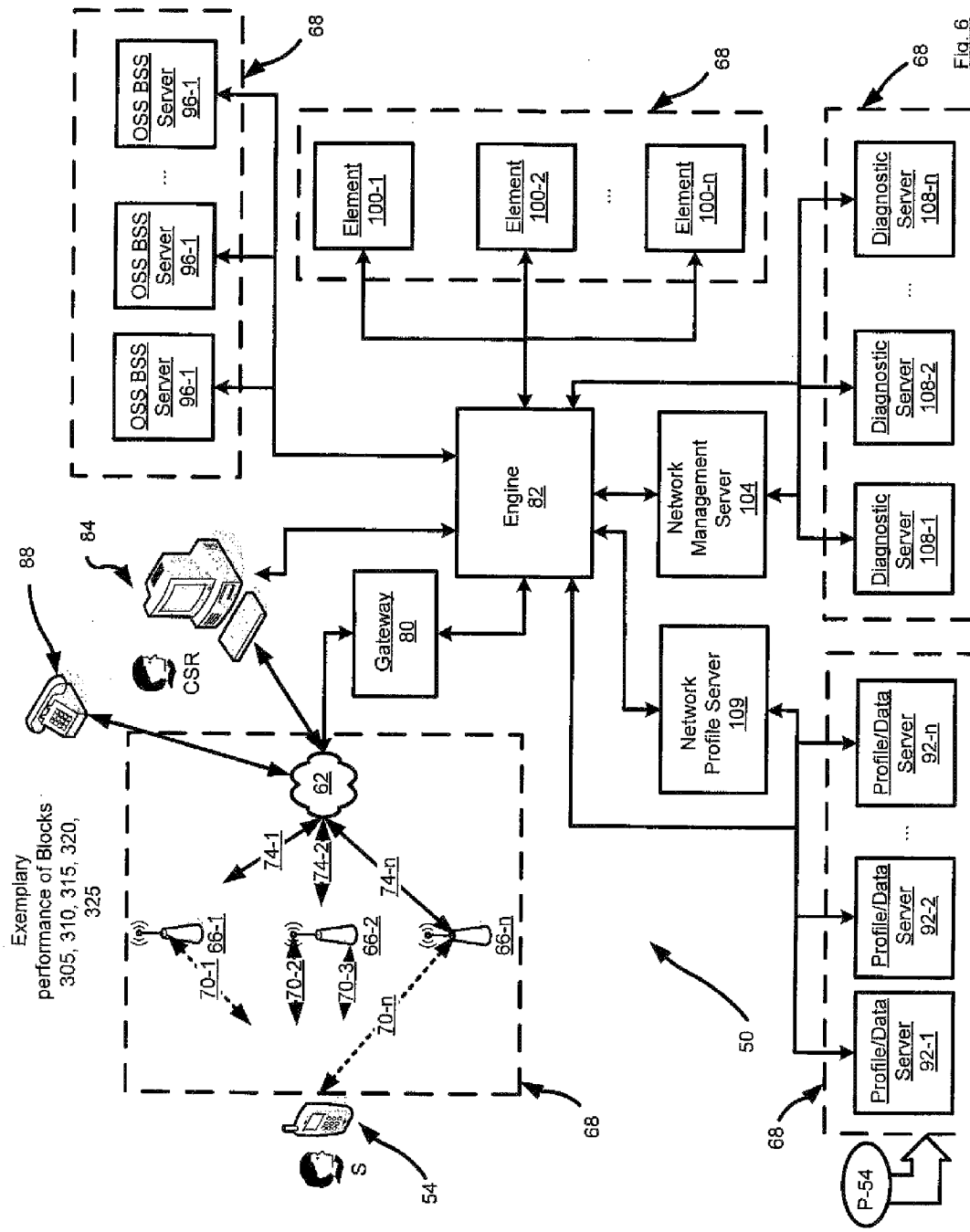
FIG. 6 shows a variation of the system of FIG. 1 in accordance with certain assumptions that are made for exemplary purposes of explaining the method of FIG. 3.

Block 335 comprises provisioning the subscriber S, device 54, and mobile network 68 according to the alternative provisioning from block 330. FIG. 6 represents this exemplary performance of block 335, wherein device 54 is shown in communication with core network 62 via link 70-*n*, base station 66-*n* and backhaul link 74-*n*. At block 335, engine 82 will update the provisioned state associated with subscriber S, device 54, and mobile network 68 in network elements 100, OSS BSS servers 96, profile servers 92 (directly or via network profile server 109). In an embodiment, at block 335, engine 82 may optionally apply new provisioned states for device 54 in profile P-54 to comply with the provisioned state of the mobile network 68. For example, in the case of UMA connectivity, this may include the activation of the associated network interface and configuration of various firewall settings in profile P-54. In an embodiment, engine 82 can access OSS BSS servers 96 to provision a new price plan relating to a new provisioned state in the mobile network 68 (for example, a reduced tariff may be applied in connection with any potential inconvenience that may be associated with the new provisioned state for the subscriber S, device 54, or mobile network 68). As another example, engine 82 can access OSS BSS servers 96 for the purpose of applying a credit value which can be applied to the subscriber's S or device's 54 pre-paid or post-paid balance or account as the case may be.

Block 340, which is optional, comprises sending one or messages indicating the alternative provisioning. One such message can be sent directly to subscriber S or device 54, indicating, for example: "We apologize that your regular GSM/EDGE service has been disrupted. We are temporarily routing your communications via a UMA connection until regular GSM/EDGE service is restored." An additional message can be sent to subscriber S or device 54, indicating that a credit (e.g. air time or other non-monetary credit, or currency or other monetary credit) is being applied to an account associated with subscriber S or device 54 to compensate for the service disruption.

To the extent that a subscriber may be associated with multiple devices, it should be understood that blocks 330, 335, and 340 can be re-performed for each device associated with subscriber S. Of note, the alternative network provisioning state determined and applied via blocks 330, 335, and 340 can be unique to each device or set to the same provisioned alternative state subject to the subscriber and device state and context received for each device via block 305.

Method 300 then advances from block 340 to block 305 where the method begins anew. The provisioning initially made at block 335 can remain in effect until such time as mobile network 68 returns to a state so that a "yes" determination can be made at block 320 relative to the default profile associated with subscriber S or device 54, or the provisioning determined at block 330 and implemented at block 335 can be continually adjusted until such a time a "yes" determination can be made at block 320 relative to the default profile associated with subscriber S or device 54. System 50 can also be configured to send various messages indicating that device 54 has been returned to normal provisioning when a "yes" determination can be made at block 320 relative to the default profile associated with subscriber S or device 54.

In another embodiment, method 300 can be adapted to be made responsive to asynchronous updates from the mobile network 68. For example, in an embodiment of block 305, the profile/data servers 92, network profile server 109, network elements 100, network management server 104, or diagnostic server 108 may proactively provide state and context information with respect to subscriber S or device 54 For example, network profile server 109 may determine that the subscriber has activated an new device (for example, the subscriber inserts his/her Subscriber Identification Module (SIM) into a new device) which is associated with additional resident applications and new interfaces and notify engine 82 of the modified state of device 54 associated with subscriber S. In an embodiment of block 310, the diagnostic servers 108 or network management server 104 proactively provides status and availability information with respect to the network state including the state of the associated network infrastructure that is used to manage or provide services to the subscriber or device. For example, diagnostic servers 108 or network management server 104 may determine that a state of congestion is occurring in one or more base-stations or backhaul links and notify engine 82 of the state and availability of the affected network infrastructure. In an embodiment of block 315, the profile/data servers 92, network profile server 109, or OSS BSS servers 96 may proactively provide provisioned status information with respect to subscriber S or device 54. For example, profile/data servers 92, network profile server 109, or OSS BSS servers 96 may determine that the subscriber has elected to subscribe to a new service package and/or a new rate plan and notify engine 82 of the modified provisioned status information with respect to subscriber S or device 54. Of note, in response to an asynchronous update, the remaining blocks associated with sub-method 301 would be invoked as required, and then method 300 would continue at block 320 as previously described.

Referring now to FIG. 7, a flowchart depicting a method for provisioning the state of the subscriber S, device 54, or mobile network 68 that is responsive to a subscriber request (call) to a customer service representative CSR is indicated generally at 700. Method 700 can be implemented using system 50, or a variant thereof.

To assist with understanding method 700, it will be discussed according to a possible implementation of method 700 using system 50. To further assist with understanding method 300, the following assumptions will be made about system 50. It will be assumed that:

a) interface 216-1, link 70-1, base station 66-1 and backhaul link 74-1 are configured to operate using the GSM protocol;

b) interface 216-2, link 70-2, base station 66-2 and backhaul link 74-2 are configured to operate using the EDGE protocol;

c) interface 216-3, link 70-3 are configured to operate using the 3G protocol, and that base station 66-2 and backhaul link 74-2 are additionally configured to operate using a 3G protocol; and d) interface 216-*n*, link 70-*n*, base station 66-*n* and backhaul link 74-*n* are configured to operate using a UMA protocol.

Element 100-1 can therefore be any type of known network element that is consistent with a GSM network, such as a HLR, a VLR, a MSC, a SMSC or the like that operates according to the standards that govern GSM. Element 100-2 can therefore be any type of known network element that is consistent with a EDGE access technology and protocol, such as an HLR, a VLR, an MSC, a SGSN, a GGSN or the like that operates according to the standards that govern EDGE. Element 100-3 can therefore be any type of known network element that is consistent with a 3G network, such as an HLR, a VLR, an MSC, a SGSN, a GGSN, a PCEF, a PCRF, a CSCF or the like that operates according to the 3G standard. Element 100-*n* can therefore be any type of known network element that is consistent with a UMA network such as an AAA server, a UNC, a PDG or the like that operates according to the standards that govern a UMA network.

It will also be assumed that the profile associated with subscriber S and device 54 is defined to according the contents of Table I. In an embodiment, the profile may be correlated with device profile P-54.

As previously noted, FIG. 4 shows a representation of system 50 wherein Table I is stored on profile servers 92 (and in an embodiment, the profile defined by Table I may be correlated with device profile P-54). FIG. 4 also represents that links 70-1 and 70-2 are active, as both links 70-1 and 70-2 are drawn in FIG. 4 as interconnecting device 54 and their respective base stations 66, which is consistent with the permissions in Table I. FIG. 4 also shows a representation that links 70-3 and 70-*n* are inactive, as both links 70-3 and 70-*n* are drawn in FIG. 4 as not interconnecting device 54 and their respective base stations, which is also consistent with the permissions in Table I.

Continuing now with the explanation of method 700, block 702 comprises the customer service representative CSR receiving a call (or message) from a subscriber S whereby the subscriber indicates that there may be an issue with one or more services, the network, or a device. The customer service representative CSR will solicit or request any incremental information from the subscriber in order to assist in the apparent issue as described by the subscriber S including but not limited to, any identifiers associated with the subscriber or device (e.g. Mobile Station ISDN or International Mobile Subscriber Identity, or an identifier that is unique to the network operator).

Upon receiving sufficient information, the customer service representative initiates method 701, implemented in a present embodiment as a sub-method comprising blocks 705, 710, and 715. The hashed-box in FIG. 7 labelled with reference 701 represent that the blocks 705, 710, and 715 collectively constitute a method of receiving the state and context of subscriber S or device 54; receiving the network state; and receiving the provisioned status of subscriber S or device 54 including current device provisioning as well as the current provisioning of network infrastructure. Of note is that not all blocks of method 701 need be performed in order to retrieve the data associated with sub-method 701.

Block 705 comprises receiving the state and context of subscriber S or device 54. In system 50, block 705 is performed by engine 82 receiving state and context information about subscriber S or device 54. Such state and context information about subscriber S or device 54 can be obtained by querying elements 100, profile/data servers 92, network profile server 109, network management server 104, OSS BSS servers 96, and diagnostic servers 108. Exemplary queries in an embodiment include retrieving the current subscription, rate-plan, service, and application profile information for subscriber S or device 54. Exemplary queries in an embodiment also include retrieving the active access technologies for a given subscriber S or device 54 (e.g. 2G, 3G, UMA), which applications or services are active or resident on a device (e.g. circuit switched voice, instant messaging, mobile TV), the current location of subscriber S or device 54 (e.g. device 54 is presently served by base station 66-1 with associated geodetic coordinates; device 54 is presently located at WGS-84 coordinates: 6,378,137.0 m (semi-major axis a), 6,356,752.314 245 m (semi-minor axis b), 298.257 223 563 (inverse flattening)), which application servers are providing services to subscriber S or device 54 (e.g. element 100-3 (not shown), an instant messaging server, is supporting the instant messaging application resident on device 54). In the example shown in FIG. 7, a query to diagnostic servers 108 indicates that links 70-1 and 70-2 are active. In another example, a query to network elements 100 (e.g. an HLR) indicates that the device has registered on the network and has requested services to be provided via GSM and EDGE. In another example, a query to profile servers 92 indicates that one or more value added services (e.g. instant messaging, mobile TV) associated with subscriber S or device 54 are active or inactive as the case may be.

Block 710 comprises receiving the network state including the state of the associated network infrastructure that is used to manage or provide services to the subscriber or device including network elements, service delivery nodes, content partners, operational support systems, business support systems, bearer and transport systems, as well as access technologies used to link the network to electronic devices. In system 50, block 710 is performed by engine 82 receiving state information about mobile network 68 from diagnostic servers 108 directly or via network management server 104. In other embodiments, engine 82 can also receive state information about mobile network from elements 100 or OSS BSS servers 96. In the example shown in FIG. 7, diagnostic servers 108 or network management server 104 provides availability and status information about backhaul links 74-1, 74-2, . . . 74-*n* as well as the associated network infrastructure used to provide services to Subscriber S or device 54. For example, a query to diagnostic servers 108 or network management server 104 would indicate the status and availability for network element 100-3 (not shown) (an instant messaging server) that is supporting an instant messaging application resident on device 54.

Block 715 comprises receiving the provisioned status of subscriber S or device 54 including current device provisioning as well as the current provisioning of network infrastructure that manage or provide services to the subscriber or device including network elements, service delivery nodes, content partners, operational support systems, business support systems, bearer and transport systems, as well as access technologies used to link the mobile network 68 to the device 54. In system 50, block 715 is performed by engine 82 receiving provisioned status information for subscriber S or device 54 from profile/data servers 92 or network profile server 109. In other embodiments, engine 82 can also receive subscriber S or device 54 provisioned status information from OSS BSS servers 96. In the example shown in FIG. 7, profile/data servers 92 or network profile server 109 provide provisioned status information used to provide services to subscriber S or device 54. For example, a query to profile/data servers 92 or network profile server 109 indicates that the subscriber is subscribed to receive GSM and EDGE services and has an active subscription to an instant messaging service. As another example, a query to profile/data servers 92, network profile server 109, or OSS BSS servers 96 indicates that the subscriber is associated with a pre-paid account and application specific rate plan for the instant messaging service as well as a post-paid account and associated rate plan for a number of GSM and EDGE services. In an embodiment, the engine 82 may query the history and usage patterns associated with subscriber S or device 54 including the actions invoked using device 54 and usage of network resources (as typically indicated by event records generated or maintained by network elements, service delivery nodes, content partners, operational support systems, business support systems, bearer and transport systems, as well as access technologies used to link the mobile network 68 to device 54). For example, the engine 82 may query profile/data servers 92, network profile server 109, or OSS BSS servers 96 and ascertain that subscriber S has exceeded the allocated volume of minutes or data associated with the subscriber's rate plan by more than 25% for the last three consecutive billing periods or that the subscriber S has repeatedly requested services that are not readily provided by the default access technologies (e.g. mobile TV or Voice over IP via EDGE).

To the extent that a subscriber may be associated with multiple devices, it should be understood that blocks 705, 710, and 715 can be re-performed for each device associated with subscriber S.

Block 720 comprises determining whether the state and context of subscriber S or device 54 from block 705, the network state from block 710, and the provisioned status of subscriber S or device 54 from block 715 are consistent. If "yes", then method 700 advances from block 720 to block 725 where an indication is provided to the customer service representative CSR that the profile associated with subscriber S and device 54 is consistent with the provisioned state of the network. In the example in FIG. 7, a "yes" determination would be made at block 320, because a) the state and context of subscriber S or device 54 including the status of the available network interfaces and links are consistent with the available backhaul links 74-1 and 74-2; device 54 has registered with mobile network 68 and the requested services are consistent with the capabilities provided by mobile network 68; b) the associated network infrastructure including links 70-1 and 70-2 and network elements are active and available or operational for the purpose of providing the subscribed or requested services for subscriber S or device 54 and; c) the provisioned status associated with subscriber S or device 54 is consistent with the state and context of subscriber S or device 54 as well as the network state associated with network infrastructure used to provide services to subscriber S or device 54 (e.g. the network is capable of providing GSM and EDGE services to device 54 via backhaul links 74-1 and 74-2; the instant messaging server is active and can support the instant messaging service resident on device 54 via backhaul link 74-2).

In an embodiment, at block 725, the customer service representative may optionally proactively apply or reaffirm provisioned states in network elements 100, OSS BSS servers, profile servers 92 (directly or via network profile server 109) using engine 82. In an embodiment, at block 725, upon instruction by the customer service representative CSR, engine 82 may optionally proactively apply or reaffirm provisioned states for device 54 in profile P-54 to comply with the provisioned state of the mobile network 68.

To the extent that a subscriber may be associated with multiple devices, it should be understood that blocks 725 can be re-performed for each device associated with subscriber S.

Upon completion of block 725, method 700 returns to block 702 where method 700 begins anew or alternatively method 700 terminates with the customer service representative CSR and subscriber S achieving consensus that there is no apparent issue that can be resolved by modifying the provisioned state of the subscriber, device, or mobile network. To the extent that the method 700 is effectively terminated by the termination of the call (or message sequence), method 300 can be invoked to proactively monitor for and resolve discrepancies between the state and context of the subscriber and device, the state of the network, and the provisioned state of the subscriber, device, and network.

As previously noted, FIG. 5 shows another set of assumptions about system 50, wherein various links that are available to subscriber S or device 54 are NOT consistent with the profile (according to Table I) that is associated with subscriber S or device 54. Of note is that in FIG. 5, backhaul links 74-1 and 74-2 are disabled, for whatever reason, and therefore base stations 66-1 and 66-2 are not connected to core network 62, essentially rendering links 70-1 and 70-2 unavailable to subscriber S or device 54.

Thus, when blocks 705-720 are performed using the assumptions in FIG. 5, a "No" determination is made at block 720. More specifically, in the example in FIG. 7, a "No" determination would be made at block 720, because a) the state and context of subscriber S or device 54 including the status of the available network interfaces are not consistent with the disabled backhaul links 74-1 and 74-2; device 54 has effectively deregistered with mobile network 68 and previously requested services cannot be provided by mobile network 68; b) a subset of the associated network infrastructure including links 70-1 and 70-2 are inactive otherwise not operational for the purpose of providing the subscribed or requested services for subscriber S or device 54 and; c) the provisioned status associated with subscriber S or device 54 is not consistent with the state and context of subscriber S or device 54 as well as the network state associated with network infrastructure used to provide services to subscriber S or device 54 (e.g. the network is not capable of providing GSM and EDGE services to device 54 via backhaul links 74-1 and 74-2; the instant messaging server is active and cannot support the instant messaging service resident on device 54 via disabled backhaul link 74-2). Furthermore, at block 710, an update of the network state indicates that while links 74-1 and 74-2 are unavailable, that link 74-n is available and that link 70-n is available. Thus, at block 720, a determination is made that the state and context of subscriber S or device 54 from block 705, the network state from block 710, and the provisioned status of subscriber S or device 54 from block 715 are NOT consistent, and therefore a "No" determination is made at block 720.

Block 722 comprises the indication to the customer service representative CSR that the profile associated with the subscriber S or device 54 is not consistent with the provisioned state. Engine 82 will determine and display one or more alternative provisioned states provisioning for subscriber S, device 54, or mobile network 68. In the example of FIG. 5, an alternative provisioning for subscriber S or device 54 can be determined so that UMA connectivity is provided to device 54 via link 70-n, base station 66-n, and backhaul link 74-n as well as any other relevant network elements associated with core network 62. Specifically, at block 722, a modified provisioned state that uses UMA connectivity would be determined as: a) the requested services associated with subscriber S or device 54 are consistent with capabilities provided with mobile network 68 using UMA connectivity (for example, voice and instant messaging services can be provided using UMA connectivity); b) the network infrastructure associated with UMA connectivity including link 70-n, base station 66-n, and backhaul link 74-n as well as any other relevant network elements associated with core network 62 are active and available or operational for the purpose of providing the subscribed or requested services for subscriber S or device 54 and; c) the alternative provisioned state for the subscriber S, device 54, and mobile network 68 would result in a state and context for subscriber S and device 54 that is relatively consistent with the default state and context for subscriber S and device 54 in the context of the default services and applications which would otherwise be made available to subscriber S or device 54 prior to the transient events that caused one or more disruptions within mobile network 68 (for example, voice and instant messaging services can be provided using UMA connectivity).

Block 730 comprises the customer service representative selecting the preferred alternative provisioning state and instructing engine 82 to execute the provisioning of the selected alternative state.

Block 735 comprises provisioning the subscriber S, device 54, and mobile network 68 according to the alternative provisioning from block 730. FIG. 6 represents this exemplary performance of block 735, wherein device 54 is shown in communication with core network 62 via link 70-n, base station 66-n and backhaul link 74-n. At block 735, engine 82 will update the provisioned state associated with subscriber S, device 54, and mobile network 68 in network elements 100, OSS BSS servers 96, profile servers 92 (directly or via network profile server 109). In an embodiment, at block 735, engine 82 may optionally apply new provisioned states for device 54 in profile P-54 to comply with the provisioned state of the mobile network 68. For example, in the case of UMA connectivity, this may include the activation of the associated network interface and configuration of various firewall settings in profile P-54. In an embodiment, engine 82 can access OSS BSS servers 96 to provision a new price plan relating to a new provisioned state in the mobile network 68 (for example, a reduced tariff may be applied in connection with any potential inconvenience that may be associated with the new provisioned state for the subscriber S, device 54, or mobile network 68). As another example, engine 82 can access OSS BSS servers 96 for the purpose of applying a credit value which can be applied to the subscriber's S or device's 54 pre-paid or post-paid balance or account as the case may be.

Block 740, which is optional, comprises sending one or messages indicating the alternative provisioning. One such message can be sent directly to subscriber S or device 54, indicating, for example: "We apologize that your regular GSM/EDGE service has been disrupted. We are temporarily routing your communications via a UMA connection until regular GSM/EDGE service is restored." An additional message can be sent to subscriber S or device 54, indicating that a credit (e.g. air time or other non-monetary credit, or currency or other monetary credit) is being applied to an account associated with subscriber S or device 54 to compensate for the service disruption. Those skilled in the art will recognize that the customer service representative CSR can also convey the outcome to the subscriber verbally.

To the extent that a subscriber may be associated with multiple devices, it should be understood that blocks 722, 730, 735, and 740 can be re-performed for each device associated with subscriber S. Of note, the alternative network provisioning state determined and applied via blocks 722, 730, 735, and 740 can be unique to each device or set to the same provisioned alternative state subject to the subscriber and device state and context received for each device via block 705.

Method 700 then advances from block 740 to block 702 where the customer service representative CSR can solicit an additional query from the subscriber S or alternatively the customer service representative (or subscriber) can terminate the call. To the extent that the method 700 is effectively terminated by the termination of the call, method 300 can be invoked to proactively monitor for and resolve discrepancies between the state and context of the subscriber and device, the state of the network, and the provisioned state of the subscriber, device, and network.

Those skilled in the art will appreciate that the involvement of the subscriber S and the CSR in the foregoing description is for illustrative purposes, to demonstrate how subscribers S and CSR can interact with the novel and inventive technical features of engine 82 and the other components herein.

It is again to be reiterated that the examples above are simplified. Table II shows a more complex example of a profile for subscriber S or device 54.

TABLE II

Complex example of profile P-54 for Subscriber S or Device 54

| Service Identity | Network Interface | Protocol | Network ID | Permitted/Not Permitted | Rate | Subscribed Services |
|---|---|---|---|---|---|---|
| 1 | 216-1 | GSM | Home Network | Permitted | Voice: $0.20 per minute; SMS: $0.10 per message | Voice, SMS |
| 2 | 216-1 | GSM | Roaming Network | Permitted | Voice: $0.40 per minute; SMS: $0.20 per message | Voice, SMS |
| 3 | 216-2 | EDGE | Home Network | Permitted | Voice: $0.25 per minute; SMS: $1^{st}$ 100 free per | Voice, SMS, MMS, Data (max rate per EDGE) |

TABLE II-continued

Complex example of profile P-54 for Subscriber S or Device 54

| Service Identity | Network Interface | Protocol | Network ID | Permitted/Not Permitted | Rate | Subscribed Services |
|---|---|---|---|---|---|---|
| | | | | | month, $0.10 per message thereafter; MMS: $0.50 per message; Data: $1.00 per Mb | |
| 4 | 216-2 | EDGE | Roaming Network | Permitted | Voice: $0.50 per minute; SMS: $0.20 per message; MMS: $0.75 per message; Data: $2.00 per Mb | Voice, SMS, MMS, Data (max rate per EDGE) |
| 5 | 216-3 | 3G | Home Network | Not Permitted | Voice: $10.00 per month; SMS: unlimited; MMS: $0.10 per message; Data: $0.12/MB | Voice, SMS, MMS, Data (maximum rate 512 kb), mobile TV, social networking application A |
| 6 | 216-3 | 3G | Roaming Network | Not Permitted | Voice: $1.00 per minute; SMS: $ 0.20 per message; MMS: $0.20 per message; Data: 0.75/MB | Data, SMS, MMS, Data, (maximum rate 128 kbps) no home network provided value added services |
| 7 | 216-4 | UMA | Home Network | Not Permitted | N/A | N/A (redirect to customer service landing page for data access) |
| 8 | 216-4 | UMA | Home Network | Not Permitted | Voice: $10.00 per month; SMS: unlimited; Data: $10.00 for 5 Gb per month, $0.10/MB thereafter | Voice, SMS, Data (maximum rate 1 mbps), mobile TV, social networking application ABC |
| 9 | 216-4 | UMA | Roaming Network | Not Permitted | Voice: $0.50 per minute; SMS: $ 0.20 per message; Data: $0.50/MB | Data, SMS, Data, (maximum rate 128 kb) no home network provided value added services |

Thus, an examination of Table II shows more complex criteria regarding the profile for subscriber S or device 54, including roaming privileges, rates, and data types. Thus, when method 300 (or method 700) is performed using the profile in Table II, a greater number of considerations are required to establish consistency at block 320 (block 720). Further, if consistency is not found at block 320 (block 720), then various ones of the restrictions in Table II can be ignored so as to permit device 54 to function in a manner that is substantially consistent with the profile in Table II.

Thus, for example, assume "Service Identity 1" from Table II was not available, because of, for example, a temporarily failure of a GSM base station 66 that was reachable by device 54, but that an 3G base station 66 was available to device 54 via interface 216-2. Then when engine 82 performs method 300 (or method 700), alternative provisioning can be established at block 335 (method 720) so that device 54 can, during the outage of the GSM base station 66, access the 3G base station 66 for voice telephone calls at the rate (20 cents per minute for voice calls) associated with "Service Identity 1" from Table II, rather than rather than being denied voice call access to 3G base station 66 and charging the account associated with device 54 in accordance with the $10 per month rate normally associated with "Service Identity 5" from Table II. Alternatively, when engine 82 performs method 300 (or method 700), alternative provisioning can be established at block 335 (block 735) so that device 54 can, during the outage of the GSM base station 66, access the UMA base station 66 for voice telephone calls at the rate (20 cents per minute) associated with "Service Identity 1" from Table II, rather than being denied voice call access to UMA base station 66 altogether in accordance with "Service Identity 8" from Table II. Numerous other examples of alternative provisioning according to block 335 (block 735) will now occur to those of skill in the art.

The invention claimed is:

1. A method for dynamically provisioning at least one of a network and a portable electronic device connectable to said network via one or more communication links comprising:
  receiving a network state of said network at a provisioning engine connected to said network, said network state indicating an availability for each of said communication links;
  accessing a normal profile associated with said portable electronic device at said provisioning engine, said normal profile indicating whether said portable electronic device is permitted to communicate via each of said communication links, and wherein said normal profile comprises an identifier of a first one of said communication links based on a first protocol;
  determining, at said provisioning engine, if none of said communication links indicated as being permitted in said normal profile are indicated as being available in said network state, said determining performed by comparing said communication links indicated as being permitted in said normal profile with said communication links indicated as being available in said network state;
  when none of said communication links indicated as being permitted in said normal profile are indicated as being available in said network state:
  generating a plurality of alternative profiles at said provisioning engine, each alternative profile including a price plan and connection settings;
  sending a message identifying each of said alternative profiles from said provisioning engine to said portable electronic device for display at said portable electronic device;
  receiving a selection of one of said alternative profiles at said provisioning engine from said portable electronic device; and
  provisioning said portable electronic device within said network, by sending updated provisioning data, including said price plan and connection settings contained within said selected alternative profile, from said provisioning engine to at least one network element, according to said selected alternative profile;
  wherein said selected alternative profile comprises an identifier of a second one of said communication links, wherein said selected alternative profile includes a modified billing rate associated with said second link, and wherein said modified billing rate is equal to or less than a billing rate associated with said normal profile.

2. The method of claim 1 wherein said identifier of said second one of said communication links is based on a different protocol than said first link.

3. The method of claim 1 wherein said modified billing rate is associated with usage of said second link.

4. The method of claim 1 wherein said billing rate is less than said billing rate associated with said normal profile.

5. The method of claim 1, wherein said at least one network element includes a billing server, and wherein sending said updated provisioning data comprises sending said billing rate to said billing server, to modify billing associated with usage of said device according to said alternative profile.

6. The method of claim 1 further comprising sending a message to said portable electronic device notifying of said alternative profile.

7. The method of claim 1, further comprising receiving a device state at said provisioning engine; wherein said determining step further comprises determining if said device state is consistent with said normal profile and said network state.

8. The method of claim 1, further comprising repeating said receiving and determining steps and provisioning said device within said network according to said normal profile if said normal profile and said network state are consistent.

9. A provisioning engine comprising:
  a processor and a plurality of interfaces interconnected by said processor; said interfaces connectable, via a network, to a plurality of network elements, a network management server, and an electronic device connectable to said network via one or more communication links;
  said processor configured to receive data representing a network state of said network via said network management server, said network state indicating an availability for each of said communication links;
  said processor configured to maintain a normal profile associated with said electronic device, said normal profile indicating whether said device is permitted to communicate via each of said communication links, and wherein said normal profile comprises an identifier of a first one of said communication links based on a first protocol;
  said processor further configured to determine if none of said communication links indicated as being permitted in said normal profile are indicated as being available in said network state, said determining performed by comparing said communication links indicated as being permitted in said normal profile with said communication links indicated as being available in said network state, and when none of said communication links indicated as being permitted in said normal profile are indicated as being available in said network state, to:
  generate a plurality of alternative profiles, each alternative profile including a price plan and connection settings;
  send a message identifying each of said alternative profiles to said electronic device for display at said electronic device;
  receive a selection of one of said alternative profiles from said electronic device; and
  provision said electronic device within said network by sending updated provisioning data, including at least one of said price plan and connection settings contained within said selected alternative profile, to at least one of said network elements, according to said selected alternative profile;
  wherein said selected alternative profile comprises an identifier of a second one of said communication links, wherein said selected alternative profile includes a modified billing rate associated with said second link, and wherein said modified billing rate is equal to or less than a billing rate associated with said normal profile.

10. The engine of claim 9 wherein said identifier of said second one of said communication links is based on a different protocol than said first link.

11. The engine of claim 9 wherein said modified billing rate is associated with usage of said second link.

12. The engine of claim 9 wherein said billing rate is less than a rate associated with said normal profile.

13. The engine of claim 9, wherein said plurality of network elements include a billing server; said processor further configured to send said updated provisioning data by sending said billing rate to said billing server, to modify billing associated with usage of said device according to said alternative profile.

14. The engine of claim 9 wherein said processor is further configured to send a message to said portable electronic device notifying of said alternative profile.

15. The engine of claim 9, wherein said processor is further configured to receive a device state and wherein said processor is further configured to determine if said device state is consistent with said normal profile and said network state.

16. The engine of claim 9, wherein said processor is further configured to re-provision said device within said network according to said normal profile if said network profile and said network state are consistent.

* * * * *